Dec. 24, 1968  R. G. HOLMES  3,418,552
SEPARABLE TRANSFORMER BATTERY CHARGER
Filed June 8, 1965  2 Sheets-Sheet 1

INVENTOR.
ROBERT G. HOLMES
BY
*Leonard V. Platt*
ATTORNEY

Dec. 24, 1968    R. G. HOLMES    3,418,552
SEPARABLE TRANSFORMER BATTERY CHARGER
Filed June 8, 1965    2 Sheets-Sheet 2

Inventor:
Robert G. Holmes
by Leonard J. Platt
Attorney

United States Patent Office 3,418,552
Patented Dec. 24, 1968

3,418,552
SEPARABLE TRANSFORMER
BATTERY CHARGER
Robert G. Holmes, Westboro, Mass., assignor to General
Electric Company, a corporation of New York
Filed June 8, 1965, Ser. No. 462,175
6 Claims. (Cl. 320—2)

This invention relates to battery chargers and, more particularly to chargers for charging the batteries used in portable, hand-held, battery-operated devices.

Many devices are presently being marketed which include a hollow handle enclosing rechargeable batteries and a motor for operating some type of appliance. One example of such a device is the electric toothbrush. Devices of this type have a number of advantages, including convenience and easy portability due to their not being attached to the end of an electrical cord during use. The batteries of devices of this type are customarily recharged bewteen periods of use by placing the handle into a base which incorporates a battery charger. In many prior art devices, it was necessary to include electrical contacts on the handle itself, and also on the base, in order to form an electrical connection between the charger and the batteries.

The requirement that direct connection be made between the charger and batteries has now been overcome by means of a novel construction disclosed in United States patent application Ser. No. 356,822, filed Apr. 2, 1964, by Christie Petrides for Battery Charger, and assigned to the same assignee as the present invention. In that application, there is disclosed a construction including a separable transformer which completely eliminates the need for electrical contacts between the holder and the base. The base includes a cup-shaped receptacle made of a magnetic material. A stud of similar material extends centrally upward within the receptacle from its bottom wall. The lower portion of the receptacle encloses a primary winding which is wound about the stud and enclosed in a potting material filling the lower portion of the receptacle. The primary winding is energized by a standard electrical cord connected to an outlet.

The handle of the power actuated device is generally cylindrical at one end to fit within the receptacle and this end includes a central recess which fits over the stud. The secondary winding of the separable transformer is mounted within the handle, surrounding the central recess. The base-contacting portions of the handle are formed of a material, such as plastic, which does not interfere with the magnetic flux linkage between the primary and the secondary windings. Thus, when the handle is inserted in the base, the primary and secondary windings are effectively wound on a common core. Energizing the primary with alternating current then induces a voltage across the secondary. The output of the secondary winding passes through a suitable rectifying circuit, such as a diode, which is connected to recharge the batteries.

The present invention relates to a device which has many similarities to that of the aforementioned copending application but incorporates certain improvements therein. One disadvantage of the described prior art device arises from the fact that the receptacle must be of a magnetic material. This would normally imply the use of steel, iron, or similar materials. As the interior surface of the receptacle is exposed whenever the handle is removed, steps must be taken to protect it from corrosion and the other deleterious effects of moisture. These effects are a particular problem in devices, such as electric toothbrushes, which are commonly used in bathrooms. Cleaning also becomes a problem when the metal receptacle oxidizes. This also causes staining of the handle end.

Another problem with a charger constructed in accordance with the aforesaid prior art application arises from the fact that the electrical leads to the primary winding are connected to lugs which extend through a cutout opening in the lower portion of the receptacle. The potting material must then be cast in place within the receptacle and must extend through the opening and around the electrical connections. It would be desirable to make electrical connections in a more easily accessible location and to simplify the potting procedure.

Accordingly, it is a primary object of the present invention to provide an improved battery charger base for use with a battery operated device of the separable transformer type. Other objects are: to provide such a base having a receptacle which is substantially enclosed by a moisture-proof barrier; and to provide such a base which is easily cleaned, which is simple to assemble, and wherein the safety factor is increased.

In accordance with the present invention, there is provided a battery charger having a receptacle of magnetic material with a closed first end and an open second end. A transformer primary winding is mounted within the closed end, and a stud of magnetic material extends within the receptacle from its first end toward its second end, passing through the winding. A cup-shaped well of nonmagnetic material is at least partially enclosed within the open second end of the receptacle and includes a bottom wall which has an opening surrounding the stud. The handle of the device is inserted within the nonmagnetic well for recharging.

This invention will be better understood by the following description of a specific embodiment thereof together with the accompanying drawing, wherein.

Figure 1:
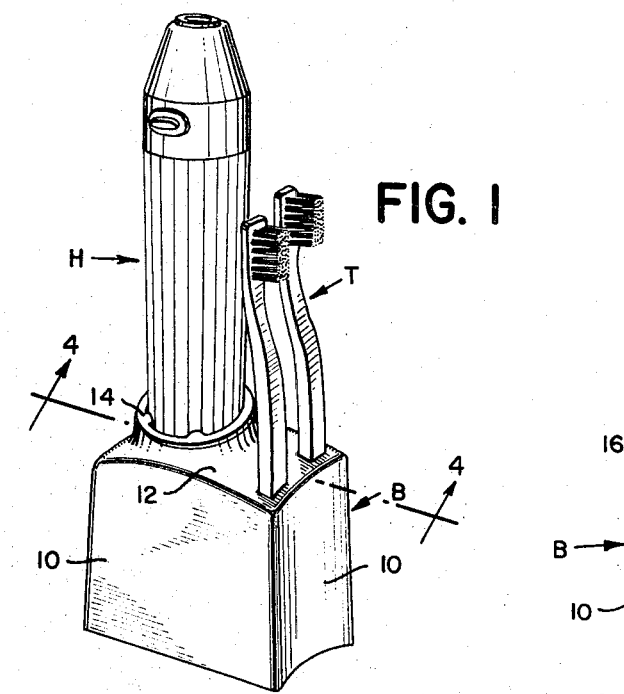
FIG. 1 is a perspective view of a battery charger in accordance with this invention, a rechargeable toothbrush handle being shown in charging position.
Figure 3:
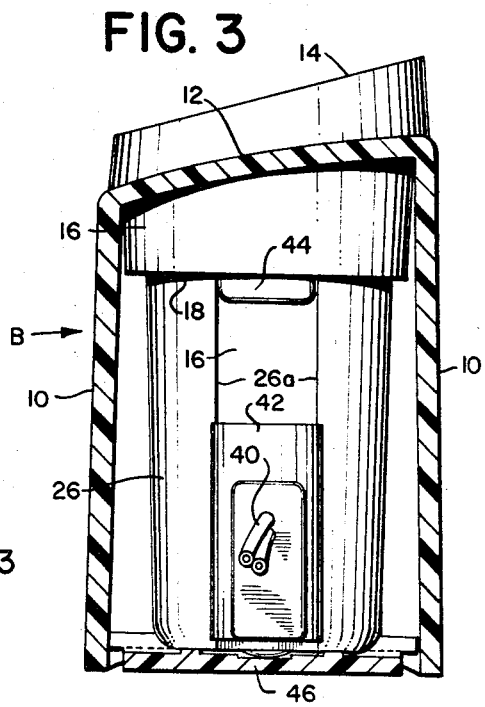
FIG. 3 is a cross section taken substantially along the line 3—3 of FIG. 2.
Figure 2:
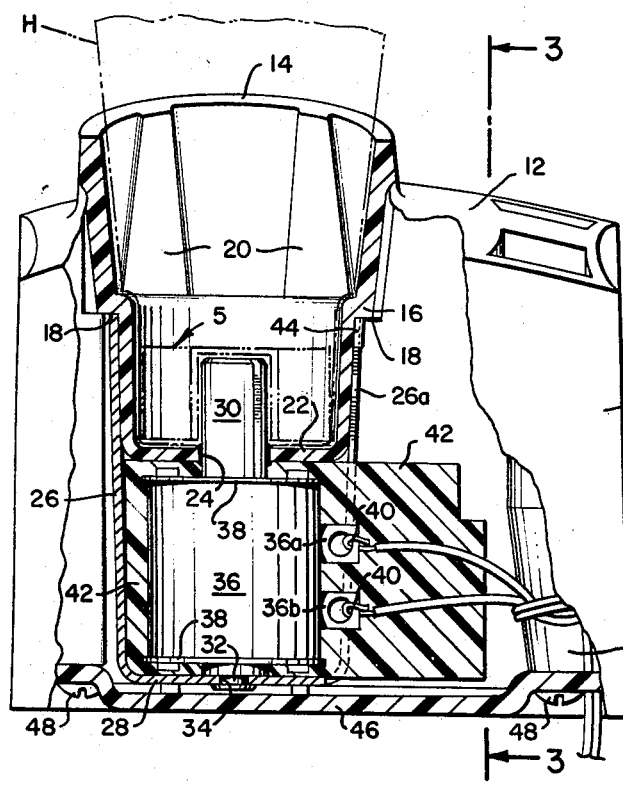
FIG. 2 is an enlarged front view of the base of the charger of FIG. 1, portions thereof being broken away to illustrate its internal construction.
Figure 4:
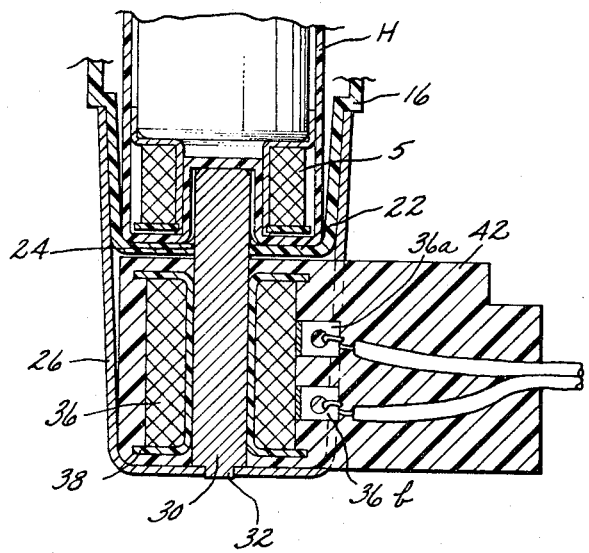
FIG. 4 is a cross section taken substantially along the line 4—4 of FIG. 1.

With particular reference to FIG. 1 there is illustrated the handle H of an electric toothbrush inserted for recharging into a base B. Toothbrushes T are stored in recesses formed in the base for easy accessibility. The battery charger base B is shown in detail in FIGS. 2 and 3. It is formed from a suitable plastic, such as a styrene, in the form of a generally hollow casing having side walls 10 and a top wall 12. The top wall 12 is molded to include an upstanding annular rim 14 which defines the upper end of a thin-walled cup-shaped well 16 which extends downwardly into the hollow interior of base B. The dimensions of the well 16 are such as to receive the end of the device to be charged. In the illustrated embodiment, the well has an upper large diameter portion separated from a lower small diameter portion by a radially extending shoulder 18. The lower portion of the well is substantially cylindrical, while the upper portion is slightly conical and includes a number of inwardly extending ribs 20 for engaging matching flutes in the outer surface of the handle H. The well 16 includes a generally horizontal bottom wall 22 which defines a central circular opening 24 therethrough. A cup-shaped metal receptacle 26 of steel or other suitable magnetic material is mounted beneath the well 16 with its upper edge engaging the shoulder 18 and its bottom wall 28 spaced from and substantially parallel to the bottom wall 22 of the well 16. The side wall of the receptacle is cut away to form a slot 26a extending from its top edge to the bottom wall 28. A central stud 30 extends upwardly within the receptacle 26 and through the opening 24 and is secured at its lower end to the receptacle by means of a pin portion 32 which passes through a rivet opening 34 in the bottom of the receptacle and is then riveted over to form a mechanical and magnetic connection between the stud and the receptacle. A primary winding 36 on a suitable spool-shaped coil form 38 is mounted in the lower portion of the receptacle 26 encircling the stud 30.

In prior art arrangements, the primary coil was potted directly into the receptacle. However, in the disclosed embodiment there is provided an improvement involving the use of the slot 26a in the side of the receptacle. In this embodiment, the winding 36, together with its terminals 36a, 36b and the ends of an electrical cord 40 which are connected thereto, are molded within a suitable encapsulating material to form an insert 42 which is mounted within the receptacle 26 and extends through the slot 26a. The insert 42 is molded with a central passageway therein which includes the central opening in coil form 38 and is slidable over the stud 30. That portion of the insert within the receptacle is substantially cylindrical, while the extending portion which surrounds the terminals 36a, 36b is narrowed to be slidable within the slot 26a. Thus the entire insert may be removed and replaced within the receptacle 26 as required. Alternatively, the stud 30 may be molded into the insert and pin portion 32 passed through opening 34 and riveted over after mounting the insert in receptacle 26.

Suitable alignment of the receptacle 26 and the cord take-off direction is provided by means of a molded lug 44 extending downward from the shoulder 18 and of a width to be engaged by the upper end of the slot 26a. The normally open bottom of base B is closed by a bottom plate 46 secured by means of screws 48 threaded into molded projections 50 provided internally of the base B.

In assembling a battery charger base in accordance with this invention, the primary winding 36 is first prepared on its form 38 and the conductors 40 of a power supply cord are secured to the terminals 36a, 36b. The primary winding and cord ends are then encapsulated by molding within a suitable plastic material, resulting in a suitably formed insert 42. This insert is then mounted around the stud 30 by sliding it downward within the receptacle 26, the narrow portion of the insert sliding downward within the slot 26a. The receptacle 26 and its included insert 42 are then positioned about the bottom portion of well 16 with the lug 44 within the slot 26a and stud 30 extending upwardly into the well through opening 24. At this time, a suitable plastic sealant is introduced between the stud 30 and the opening 24 in the well 16, which prevents the flow of moisture therethrough. The bottom plate 46 is then attached by means of the screws 48.

The toothbrush handle H which may be recharged in this invention is fully disclosed in the aforementioned copending patent application. The end of such a handle is illustrated by the broken lines in FIG. 2, which also illustrates the positioning of the secondary coil S which encircles the stud 30 when the handle is positioned as shown in FIG. 1. Under these conditions, it will be noted that the primary winding 36 and the secondary winding S are flux-linked by being effectively mounted on a common magnetic core. They are both wound about a common stud 30 and are housed within a common receptacle 26. The stud 30 and the receptacle 26 thereby form a transformer core.

It will be apparent that the described invention accomplishes all of the objectives hereinbefore set forth. For example, the metal receptacle is not exposed. Accordingly, rusting and similar corrosion is substantially reduced. Furthermore, the receptacle is fully covered by the plastic well 16, thereby introducing an additional safety factor. The interior of the plastic well 16 may be easily wiped clean and the only exposed metal is the projecting end of stud 30. Also, it will be noted that the construction is simple, rugged, and dependable.

It will be understood by those skilled in the art that a number of variations and modifications may be made in this invention. Accordingly, the foregoing description is intended to be illustrative only, rather than limiting. The following claims are to be construed as covering any variations and modifications of the invention which may reasonably be included within its spirit and scope.

What I claim as new and desire to secure by Letters Patent of the United States is:

1. A battery charger comprising: a substantially hollow base including side walls and a top wall, said top wall defining an opening therein; a thin-walled cup of nonmagnetic material extending downwardly into said base from said opening, forming a well in said top wall, the bottom of said cup defining a substantially central opening therethrough; a cup-shaped receptacle of magnetic material mounted within said base with its open end encircling said cup, the side wall of said receptacle defining a slot therethrough, and the bottom wall of said receptacle being spaced from the bottom of said cup; a stud of magnetic material having a first end secured to the bottom wall of said receptacle and a second end disposed within said cup, said stud extending through said central opening; an encapsulated transformer primary winding encircling said stud and removably positioned within said receptacle between the bottom wall of said receptacle and the bottom of said cup; and conductor means extending through said slot and connected to said primary winding to supply electrical power thereto, and a device including a battery to be recharged and having a transformer secondary coil removably positioned within said cup.

2. A battery charger comprising a substantially hollow base including side walls and a top wall, said top wall defining an opening therein; a thin-walled cup of nonmagnetic material integral with said top wall and extending downwardly into said base from said opening, forming a well in said top wall, the bottom of said cup defining a substantially central opening therethrough; a cup-shaped receptacle of magnetic material mounted within said base with its open end encircling said cup, the side wall of said receptacle defining a vertical slot therein extending from its open end to its bottom wall, the bottom wall of said receptacle being spaced from the bottom of said cup; a stud of magnetic material having a first end secured to the bottom wall of said receptacle and a second end disposed within said cup, said stud extending through said central opening; a removable insert including a cylindrical portion contained within said receptacle between the bottom wall of said receptacle and the bottom of said cup and having a vertically disposed passageway therethrough encircling said stud, and a radially extending portion passing through said slot; a transformer primary winding encapsulated within the cylindrical portion of said insert and surrounding said passageway; electrical leads extending into the radially extending portion of said insert and connected to supply electrical power to said primary winding, and a device including a transformer secondary coil movable into said cup and encircling said stud.

3. The charger of claim 2 wherein said thin-walled cup includes an outwardly extending annular shoulder on its outer surface, the open end of said receptacle being disposed against said shoulder.

4. The charger of claim 2 wherein said thin-walled cup includes a lug on its outer surface disposed within the slot of said receptacle.

5. An electrical recharger for a battery operated device comprising:
 (1) a unitary base molded from plastic electrically insulating material and defining:
  (a) side walls,
  (b) a top wall with an opening therein, and
  (c) a thin-walled cup extending downwardly into said base to removably receive an end of the device to be recharged, with the bottom of said cup having a central opening;
(2) a cup-shaped receptacle of magnetic material mounted within said base with its upper open end encircling said cup and having a vertical slot therein extending from its upper end to its bottom wall and with the receptacle bottom wall spaced from the bottom of said cup;
(3) a stud of magnetic material having its lower end secured to the bottom wall of said receptacle and its upper end extending into and disposed within said cup with means sealing said stud to said cup in the central opening,
   (a) said receptacle and said stud forming a magnetic transformer core;
(4) a transformer primary coil including insulated power supply leads therefor encapsulated in insulation and shaped to fit over said stud and within said receptacle below said cup with the power supply leads extending outwardly through the slot in said receptacle;
(5) a transformer secondary coil within said device encircling said stud when said device is positioned in said cup; and
(6) means connecting said secondary coil to recharge the battery means within said device.

6. The apparatus defined by claim 5 in which said stud is positioned within said primary coil before encapsulation.

References Cited

UNITED STATES PATENTS 3,277,358  10/1966  Nicholl _____ 320—2

JOHN F. COUCH, *Primary Examiner.*

S. WEINBERG, *Assistant Examiner.*

U.S. Cl. X.R.

336—96, 118